(12) United States Patent  (10) Patent No.: US 9,153,364 B2
Parker  (45) Date of Patent: Oct. 6, 2015

(54) APPARATUS AND METHOD FOR STRIPPING INSULATION LENGTHWISE FOM ELECTRICAL WIRES AND CABLES

(71) Applicant: Kent E. Parker, Morgan Hill, CA (US)

(72) Inventor: Kent E. Parker, Morgan Hill, CA (US)

(73) Assignee: Kent E. Parker, Morgan Hill, CA (US)

( * ) Notice: Subject to any disclaimer, the term of this patent is extended or adjusted under 35 U.S.C. 154(b) by 126 days.

(21) Appl. No.: 13/708,862

(22) Filed: Dec. 7, 2012

(65) Prior Publication Data

US 2013/0104720 A1   May 2, 2013

(51) Int. Cl.
  *H01B 15/00*   (2006.01)
(52) U.S. Cl.
  CPC ............ *H01B 15/006* (2013.01); *Y02W 30/821* (2015.05); *Y10T 83/0341* (2015.04); *Y10T 83/0385* (2015.04)

(58) Field of Classification Search
  CPC ............. H01B 15/006; Y02W 30/821; Y10T 83/0341; Y10T 83/0385
  USPC .............. 30/90.1–90.4; 83/13, 861, 870, 875, 83/879, 883; 7/107; 426/516, 518
  See application file for complete search history.

(56) References Cited

U.S. PATENT DOCUMENTS

| 2,374,211 | A |   | 4/1945  | Kane |         |
|-----------|---|---|---------|------|---------|
| 2,391,721 | A | * | 12/1945 | Lundeen | 83/102 |
| 2,434,640 | A | * | 1/1948  | Burdwood | 83/430 |
| 2,625,964 | A | * | 1/1953  | Green et al. | 30/380 |
| 2,892,475 | A | * | 6/1959  | Lapsley | 144/48.1 |
| 3,042,089 | A | * | 7/1962  | Lyons | 30/373 |
| 3,130,759 | A | * | 4/1964  | Mohr | 144/35.1 |
| 3,175,430 | A | * | 3/1965  | Smith et al. | 81/9.51 |
| 3,283,635 | A | * | 11/1966 | Johnson | 83/345 |
| 3,316,781 | A |   | 5/1967  | Bignell |       |
| 3,462,052 | A |   | 8/1969  | Wagner |        |
| 3,631,748 | A |   | 1/1972  | Kuts |          |
| 3,641,852 | A |   | 2/1972  | Terada |        |
| 3,703,035 | A | * | 11/1972 | Handy | 30/90.9 |
| 3,817,132 | A |   | 6/1974  | Emery |         |
| 3,822,615 | A |   | 7/1974  | Reed |          |
| 3,951,727 | A | * | 4/1976  | Greenberg | 156/759 |
| 4,015,497 | A |   | 4/1977  | Burgess |       |
| 4,339,967 | A | * | 7/1982  | Greenberg | 81/9.51 |
| 4,534,254 | A | * | 8/1985  | Budzich et al. | 83/425.2 |

(Continued)

OTHER PUBLICATIONS

Gensco Cable Strippers brochures, publication dates unknown, 2 pages, Gensco America, Inc., USA.

(Continued)

*Primary Examiner* — Sean Michalski
(74) *Attorney, Agent, or Firm* — James R. Cypher; Charles R. Cypher

(57) ABSTRACT

An apparatus for the stripping of insulation lengthwise from an insulated wire or cable on a continuous basis for the recovery of the metal core of the wire or cable. The apparatus has a framework supporting a rotatable feeder wheel having one or more generally "V"-shaped grooves or cable guide paths that are preferably of unlike circumferences so that varying diameters of insulated cable may be stripped quickly. The feeder wheel works in cooperation with a movable carriage assembly supporting rotatable circular cutting tools. The grooves can be formed with shoulders and relieved slots for grabbing the cable. The apparatus further has a transmission mounted to the framework and connected to the feeder wheel by a shaft. The transmission is driven by either a removable electric motor or fixed electric motor.

17 Claims, 6 Drawing Sheets

(56) References Cited

U.S. PATENT DOCUMENTS

| | | | |
|---|---|---|---|
| 4,584,912 A | 4/1986 | Gudmestad et al. | |
| 4,597,176 A | 7/1986 | Shields et al. | |
| 4,699,027 A | 10/1987 | Guyette et al. | |
| 4,753,001 A | 6/1988 | Alexander | |
| 5,105,702 A * | 4/1992 | Fara | 83/425 |
| 5,107,735 A * | 4/1992 | Ramun et al. | 83/407 |
| 5,542,327 A * | 8/1996 | Schultz | 83/861 |
| 5,806,188 A * | 9/1998 | Caraballo | 30/92.5 |
| 5,809,652 A * | 9/1998 | Ducret | 30/90.7 |
| 6,360,430 B1 | 3/2002 | Stephan | |
| 6,694,853 B2 * | 2/2004 | Adams | 83/870 |
| 7,409,897 B2 * | 8/2008 | Adams | 83/431 |
| 7,891,097 B2 * | 2/2011 | Hartranft | 30/90.3 |
| 2012/0160075 A1 * | 6/2012 | Matsudaira | 83/874 |
| 2012/0167719 A1 * | 7/2012 | Newman | 81/9.51 |
| 2012/0311866 A1 * | 12/2012 | Jones et al. | 30/90.1 |
| 2013/0104720 A1 * | 5/2013 | Parker | 83/880 |

OTHER PUBLICATIONS

Strip-Tec Wire Stripper brochures, publication date unknown, 4 pages, Strip Technology, Inc., USA.

JMC Recycling Systems brochure, publication date unknown, 1 page, JMC Recycling Systems, Ltd., United Kingdom.

Mecmac Limited Cable Stripper brochure, publication date unknown, Mecmac Limited, United Kingdom.

WADO cable stripping machines web pages, publication date unknown, 5 pages, WADO Unikate, Germany.

Cable Management web pages, publication date unknown, 2 pages, ctrecycles.com, USA.

* cited by examiner

US 9,153,364 B2

APPARATUS AND METHOD FOR STRIPPING INSULATION LENGTHWISE FOM ELECTRICAL WIRES AND CABLES

BACKGROUND OF THE INVENTION

The present invention relates to an apparatus and method for the stripping of insulation lengthwise from electrical wires and cables on a continuous basis for the recovery of the metal core.

The metal core of insulated electrical cable has a greater reclamation value if the outer insulating cover has been removed. Past practices taught burning the rubber or plastic insulation from the metal core. However, this practice released toxic pollutants into the environment and degraded the reclamation value of the metal core by contaminating the metal. Thus, many patented prior art devices teach machines that assist with or strip the insulation from an electrical cable to increase the reclamation value of the metal core. Most of these machines work in a continuous manner by pulling the cable past a knife or cutting blade by means of input or feeder wheels. The inventor has found that a key element to the efficient and long term operation of these devices is the ability of the feeder wheels of the machines to grab and pull cables in varying states of integrity and cables of different sizes and types.

One prior art device is the subject of U.S. Pat. No. 5,542,327, issued Aug. 6, 1996, to Roger Schultz. This patent teaches a cable stripping device that uses a flat input or drive wheel to pull the cable into the apparatus. The drive wheel has slots that would be difficult to clean after being filled with pulling lubricant that typically exists on older reclaimed cable. In addition, this patent teaches a device with a single input or drive wheel of a single diameter. As such the cable rate of travel will be the same for cables with large cross-sectional diameters as for cables with small diameters, making this machine a tedious means to reclaim cables with small diameters. Further the apparatus requires multiple positioning wheels of different sizes that must be interchanged to accommodate cables of different sizes. This is cumbersome and time consuming.

U.S. Pat. No. 5,107,735, issued Apr. 18, 1992, to John and Michael Ramun, teaches in-feed and exit drive rollers with cable guides made up of shallow, rounded concave grooves. These shallow, rounded gable guide grooves are likely to be subject to a rapid build-up of pulling lubricant found on the cables that will interfere with the ability of the machine to pull the cable. Similarly, U.S. Pat. No. 4,339,967 issued Jul. 20, 1982, to William B Greenberg, employs drive rollers with shallow grooves that are longitudinally corrugated that will also likely be subject to the rapid build-up of puling lubricant.

A number of other patents teach machines that strip the insulation from a cable, including: U.S. Pat. No. 3,817,132 issued Jun. 18, 1974, to Emery Manning et al., and U.S. Pat. No. 4,339,967 issued Jul. 20, 1982. These machines appear to be overly complicated devices utilizing complex mechanisms for feeding and cutting insulation from the cable metal core.

Many of the prior art wire stripping machines taught in the literature are relatively large and complicated machines that do not appear to be easily transported to a job site or stored out of the way. Further devices have only a single drive wheel, or multiple drive wheels all of a similar diameter, thus they have a single rate of speed for processing small and large cables alike, unless they use stepped motors or multiple speed transmissions. The prior art wire stripping machines also employ drive or input wheels with cable contact surfaces that will be subject to the build-up of cable pulling lubricants that will interfere with the operation of the device.

SUMMARY OF THE INVENTION

The present invention provides an apparatus and method for stripping insulation lengthwise from an insulated wire or cable on a continuous basis for the recovery of the metal core.

It is an object of the present invention to provide such an apparatus that is less susceptible to the build-up of cable pulling lubricants while also being able to accommodate modern cables that do not require lubricant.

This object is achieved in part by using a single diven feeder wheel to pull the cable through the apparatus and forming the driven feeder wheel with one or more deep grooves to receive and guide the cable.

The deep grooves are preferably generally "V"-shaped, having a pair of tapering, interior faces that grip the cable at two laterally spaced points or areas on the cable's diameter, generally at the side and slightly underneath the cable. The tapering, interior faces of the groove or cable guide path support the cable against the cutting tools which generally slit the top of the cable as it travels through the apparatus. Thus the cable is contacted at three points or areas around its circumference as it travels through the cutting assembly of the apparatus: the cutting tool at the top of the cable and two points on the underside of the cable by the cable guide path of the feeder wheel. This is in contrast to prior art devices where the cable guide or roller support just the bottom and/or the top of the cable at a single point or support the cable along much of its arced bottom by having support grooves that conform closely to the diameter of the cable. This limited contact of the present invention with the cable at the sides and slightly underneath the cable aids in the prevention of build-up of pulling lubricants on the feeder wheel that would interfere with the ability of the feeder wheel to grip the cable.

Also, in the preferred embodiment, the interior faces of the generally "V"-shaped grooves are steeply angled such that in most cases a void will be created between the cable received in the groove and the base of the groove where lubricant can be discharged.

This object is further achieved by forming the "V"-shaped grooves with shoulders that can grasp the insulation of the cable.

This object is also achieved in part by forming the "V"-shaped grooves with slots with gradually descending leading faces that create large voids in front of the shoulders which can receive any lubricants that may try to build up on the feeder wheel. The gradual or prolonged descent to the sharp gripping edge or shoulder on the feeder wheel surface provides an open space ahead of the gripping edge on the feeder wheel which limits the ability of pulling lubricants found on certain reclaimed cables to buildup on the gripping edge, interfering with its ability to cut into the cable. Build-up of lubricants can also prevent the cable from descending or being received into the slot at proper height, preventing the desired engagement of cable insulation with gripping face of slot needed to pull the cable through the apparatus.

This object is also achieved in part by forming the feeder wheel with grooves to receive the cable and fixedly connecting the feeder wheel to the driver, while using a circular cutting wheel that is not rotated by the driver and which is adjustable in height to accommodate cables of differing diameters. Being able to adjust the height of the cutting wheels with respect to the feeder groove allows for the feeder wheel to be formed with a v-shaped groove with steep sides or interior faces that are better able to resist the build-up of lubricant than a flat or shallow arc-shaped groove that closely matches the curve of the cable.

Newer cable is designed with insulation that has a surface with a low friction coefficient and as such, during installation, it requires no pulling lubricant. This is helpful during the stripping process because there is no lubricant to build-up in the apparatus; however, the low friction coefficient of the insulation makes it difficult for feeder wheels to grasp the cable. The shoulders in the grooves of the present invention allow the apparatus to grasp cables with insulation with low friction coefficients.

An additional advantage of the open slot design is that the slot can be easily cleaned of built-up pulling lubricants without having to disassemble the machine.

It is a further object of the present invention to achieve increased process feed rates for smaller wire and cable diameters without the use of expensive multiple speed motors or complicated transmission assemblies. This object is achieved in part by having one feeder wheel that has both a first "V"-shaped groove cable guide path for large cables with its base located near the axis of the feeder wheel and a second "V"-shaped groove cable guide path with its a base located at the periphery of the feeder wheel. Because the base of the second groove is located at the periphery of the feeder wheel it will generally have a higher feed rate than the larger groove whose base is located closer to the axis of the feeder wheel.

It is a further object of the present invention to be able to strip wire and cable diameters in the ranges of 0.125 of an inch though 2.50 of an inch without having to disassemble or switch parts in the apparatus, and only have to make minor adjustements. This object is achieved in part by having one feeder wheel that has both a first "V"-shaped groove cable guide path for large cables and a second "V"-shaped groove cable guide path for cables of smaller diameter.

It is an object of the present invention to offer a portable, robust, simple apparatus. This object is achieved in part by having a simple supporting structure made of aluminum plate. This object is further achieved by forming the apparatus so that it can be driven by a portable motor that is removable when the machine is transported or not in use.

The more important features of the invention have thus been outlined in order that the more detailed description that follows may be better understood and in order that the present contribution to the art may better be appreciated.

Before explaining the preferred embodiment of the invention in detail, it is to be understood that the invention is not limited in its application to the description that follows. The invention is defined by the claims.

DETAILED DESCRIPTION

Figure 1:
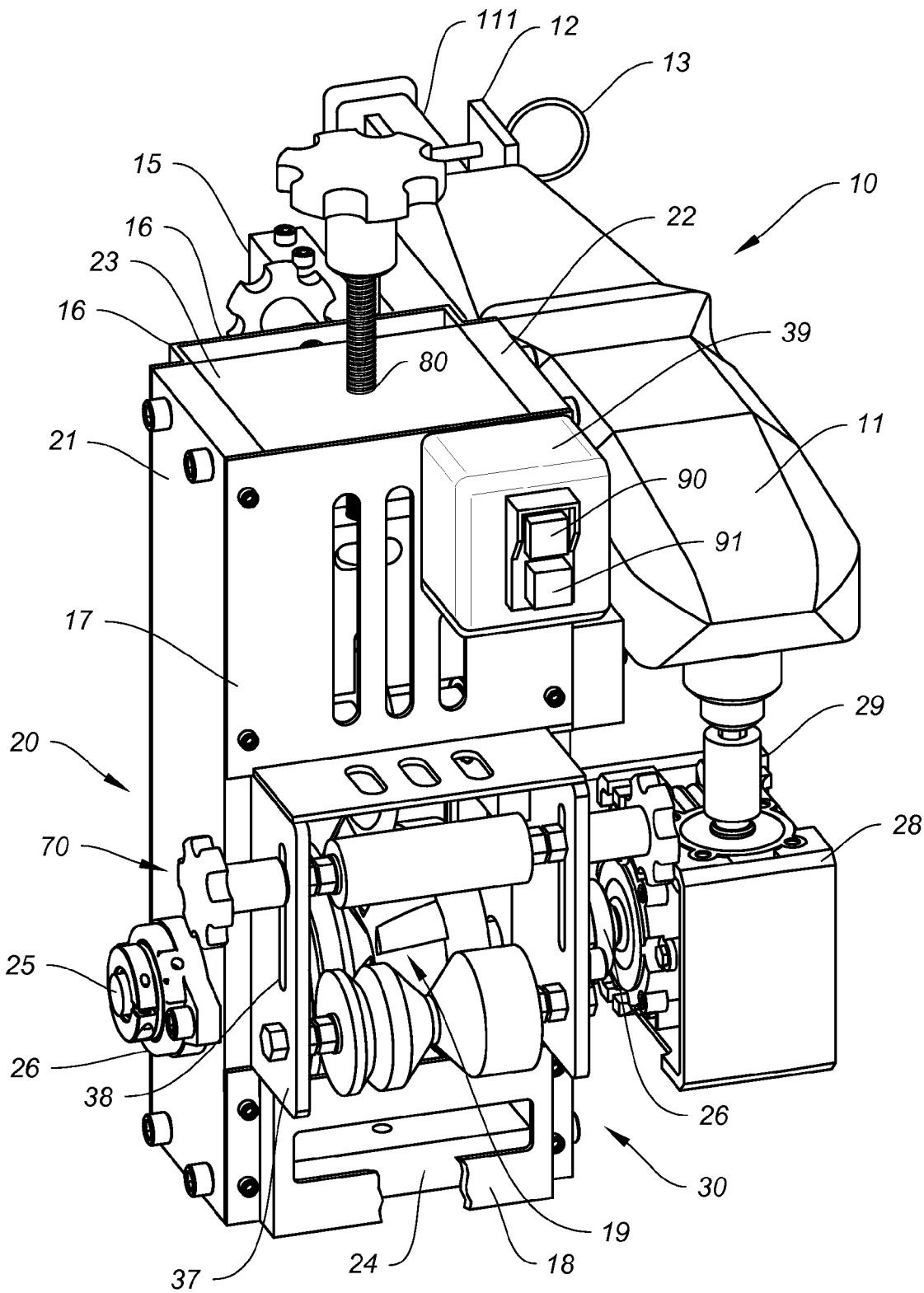
FIG. 1 is a perspective view of an apparatus having portable motor attached that powers the apparatus for stripping insulation lengthwise from electrical wires and cables on a continuous basis for the recovery of the metal core in accordance with the principles of the invention.

As shown in FIGS. 1 through 6, the present invention provides an apparatus 10 for stripping of insulation 48 lengthwise from an insulated wire or cable 47 having an inner metal core 49 on a continuous basis for the recovery of the metal core 49. The apparatus consists of a supporting frame structure 20, having a first shaft 25, with the first shaft 25 being rotatably attached to the frame structure 20 in an otherwise fixed position. A feeder wheel 40 is attached to the first shaft 25 and the first shaft 25 is coupled to a drive 11 for rotating the first shaft 25 and the feeder wheel 40 with the first shaft 25. The feeder wheel 40 has a grooved cable guide path 41 that is adapted to receive and pull the insulated wire or cable 47 through the apparatus 10 when the drive 11 rotates the feeder wheel 40. The first grove cable guide path 41 is preferably generally "V"-shaped and has an inner circumference at the bottom 141 of the groove 41.

The supporting frame structure 20 also supports a cutting assembly 50. The cutting assembly 50 has a second shaft 27 rotatably attached to the frame structure 20 in a manner that allows the position of the second shaft 27 to be adjusted with respect to the first shaft 25. A first circular cutting tool 45 is mounted on the second shaft 27 which is able to freely rotate. The first cutting tool 45 is aligned with and cooperates with the first generally "V"-shaped groove cable guide path 41. The first cutting tool 45 of the cutting assembly 50, in conjunction with the feeder wheel 40, is adapted to align and penetrate cable insulation 48 of a cable 47 contained between the first generally "V"-shaped groove 41 and the first cutting tool 45 so that insulation 48 may be removed from metal core 49. Rotating circular cutting tool 45 is preferred to a stationary single edged blade. In operation, the cutting tool 45 will sometimes also dig into the metal core 49 of the cable 47. If the tool 45 was stationary, too much friction and heat would be generated that would significantly reduce the useful life of the cutting tool 45. By using a circular blade for the cutting tool 45 the forces on the blade are in a form of compression not friction. The circumference of the edge of the blade 45 that is in contact with the cable 47 will rotate at the same rate as the cable 47. This avoids the friction and heat problem, because the blade 45 is preferably heat treated to withstand the compression/abrasion factors associated with contacting the metal core 49 of the cable 47, the blade 45 can maintain a sharp edge for years of regular use.

Figure 2:
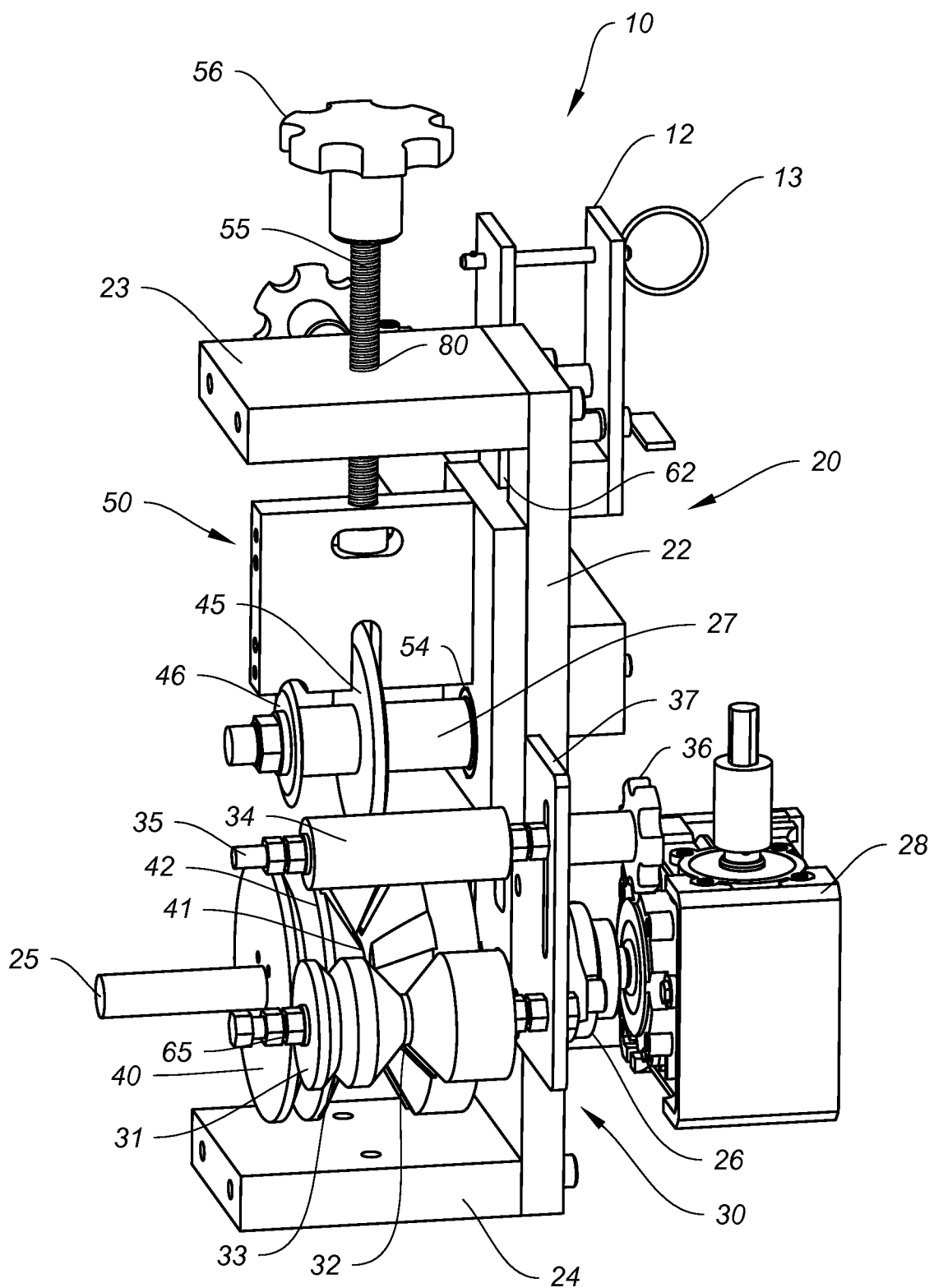
FIG. 2 is a perspective view of the apparatus of the present invention. Portions of the apparatus are not shown for clarity.

In the preferred embodiment as shown in FIGS. 1 and 2, the feeder wheel 40 has a second grooved cable guide path 42, and the second grooved cable guide path 42 is preferably generally "V"-shaped and has an inner circumference at the bottom 142 of the groove 42. In the preferred embodiment, inner circumferences of the first and second generally "V"-shaped grooves 41 and 42 are of dissimilar dimension, and the first generally "V"'-shaped groove 41 of the feeder wheel 40 has an inner circumference dimension that is less than the inner circumference dimension of the second generally "V"-shaped groove 42. Furthermore, the second shaft 27 of the cutting assembly 50, has mounted thereon a second circular cutting tool 46 which is able to rotate, and the second cutting tool 46 is aligned with and cooperates with the second "V"-shaped groove cable guide path 42.

FIG. 1 shows the wire stripping apparatus 10 of the present invention. The apparatus 10 includes a structural frame work 20 which preferably includes side members 21 and 22, a top plate 23 and a base plate 24. Side members 21 and 22 are preferably planar members disposed in parallel. The framework 20 is shown with protective guards 16, 17, and 18 in place. The path 19 of the cable 47 as it travels through the apparatus 10 is also shown.

FIG. 1 also shows the apparatus 10 as it would be used where the driver is a portable electric motor 11, such as a hand-held electric powered screw driver and/or drill. The motor 11 is attached by placing the handle 111 of the screw driver in bracket 12. The motor is secured in place by pin 13. Bracket 12 is attached to structural support parallel planar side member 22 by support member 15.

The drill motor 11 is connected to the first shaft 25 by a transmission 28 such that when the portable drill motor 11 rotates, the feeder wheel 25 will also rotate.

Motor 11 is controlled by electric switch 39, the wiring of which is not shown. The apparatus 10 is shown with a portable electric motor 11 that can be used separately from the apparatus 10 for other purposes. Naturally, a fixed, dedicated electric motor may be utilized as the driving mechanism 11 as well; however, this makes the unit less portable and easy to store.

The first shaft 25 is connected by a transmission 28 to the portable drill motor 11 such that when portable drill motor rotates 11, the first shaft 25 will rotate along with a drive or feeder wheel 40 that is attached to it. This drive or feeder wheel 40 pulls the cable 47 through the apparatus 10 and along a cutting wheel 45 or 46 to make a slit in the insulation 48 so it can be removed from the core 49.

The first rotatable shaft 25 is supported by the first and second vertically spaced, parallel planar side members 21 and 22. Preferably, shaft 25 is placed in bearings 26 supported by the side members 21 and 22. Shaft 25 is coupled by transmission 28 to portable motor 11 such that when portable motor rotates, the first shaft 25 will also rotate. Connecting member 29 connects the transmission to the motor 11.

FIG. 2 is a perspective view, with some parts removed for clarity, of the cable stripper apparatus 10. The structural framework 20 supports first rotatable shaft 25. A first bearing 26 is mounted to first side member 21 and a second bearing 26 is mounted to second side member 22.

In the preferred embodiment, feeder wheel 40 has a first regular grooved cable path 41 located at the midline of feeder wheel and a second regular grooved cable path 42 located at the periphery of the feeder wheel 40. Each has a different circumference and internal diameter. Grooves 41 and 42 in said feeder wheel preferably function as guides for wire or cables 47 in a range of different diameters.

As shown in FIG. 2, positioned adjacent to said feeder wheel 40 is a cutting tool carriage assembly 50. This carriage assembly 50 has bearings 54 which support a second rotatable shaft 27. In the preferred embodiment, securely fastened to the second shaft 27 is a first rotatable circular cutting tool 45 and a second rotatable circular cutting tool 46. Preferably, the cutting tools 45 and 46 are affixed to the second shaft 27, and the shaft rotates 27 rotate in the bearings 54. The first cutting tool 45 is aligned with and cooperates with feeder wheel first groove cable guide 41. The second cutting tool 46 is aligned with and cooperates with feeder wheel second groove cable guide 42.

FIG. 2 further illustrates cable guide 30. The cable guide or roller assembly 30 is located upstream of the feeder wheel 40. The cable guide 30 has a fixed, lower rotating guide roller 31 on a third shaft 65, and a movable, upper rotating guide roller 34 on a fourth shaft 35. Upper rotating guide roller 34 cooperates with the lower guide roller 31 to direct and guide the cable 47 towards the feeder wheel 40. The lower guide roller 31 is adapted for providing support to a cable 47 against gravity during feeding into the apparatus 10. The upper rotating guide roller 34 is adjustable in height in relation to the lower fixed, rotating guide roller 31 to accommodate cable 47 of varying diameters. The upper adjustable rotatable guide roller 34 is mounted in relation to the lower guide roller 31 so that when the height of the upper guide roller 34 is properly adjusted it will corporate with the lower guide roller 31 to align and guide cable 47 into the feeder wheel 40.

Preferably, the lower rotatable guide roller 31 has one or more generally "V"-shaped groove cable guide paths 32 and 33 that correspond with the one or more generally "V"-shaped groove cable guide paths 41 and 42 of the feeder wheel 40. In the particular embodiment shown, guide roller 31 has a first "V"-shaped grove cable path 32 that aligns with the feeder wheel's first "V"-shaped groove cable path 41, and second "V"-shaped groove cable path 33 aligns with feeder wheel second "V"-shaped groove cable path 42.

The cable guide 30 is held in place by support members 37 which are attached to the parallel planar side members 21 and 22.

As with the feeder wheel 40 and cutting assembly 50, upper guide roller 34 is vertically adjustable. Adjustable assembly 70 includes guide roller shaft 35 upon which guide roller 34 is positioned. Connected to shaft 35 are loosening knobs 36. By loosening knobs 36 the operator can move the guide roller shaft 35 vertically in the supporting member slots 38 of support members 37, allowing guide roller 34 to move toward or away from lower roller guide 31 to accommodate varying diameters of insulated cable 47. The cable is aligned with and directed towards feeder wheel 40.

FIG. 2 further illustrates the cutting edge of the first circular insulation cutting tool 45 being located in or above the center of feeder wheel first "V"-shaped groove 41 and the cutting edge of the second rotatable circular insulating cutting tool 46 being located above the center of the feeder wheel second "V"-shaped groove 42. The actual vertical position of the cutting tools 45 and 46 during the cutting procedure depends upon the diameter of the wire or cable 47 which is being stripped of insulation 48. The circular cutting tools 45 and 46 supported in carriage assembly 50 can be moved vertically toward or away from the feeder wheel 40.

Preferably, the peripheries of the first and second circular cutting tools 46 and 46 have sharpened edges and are formed of heat-treated tool steel.

Figure 3:
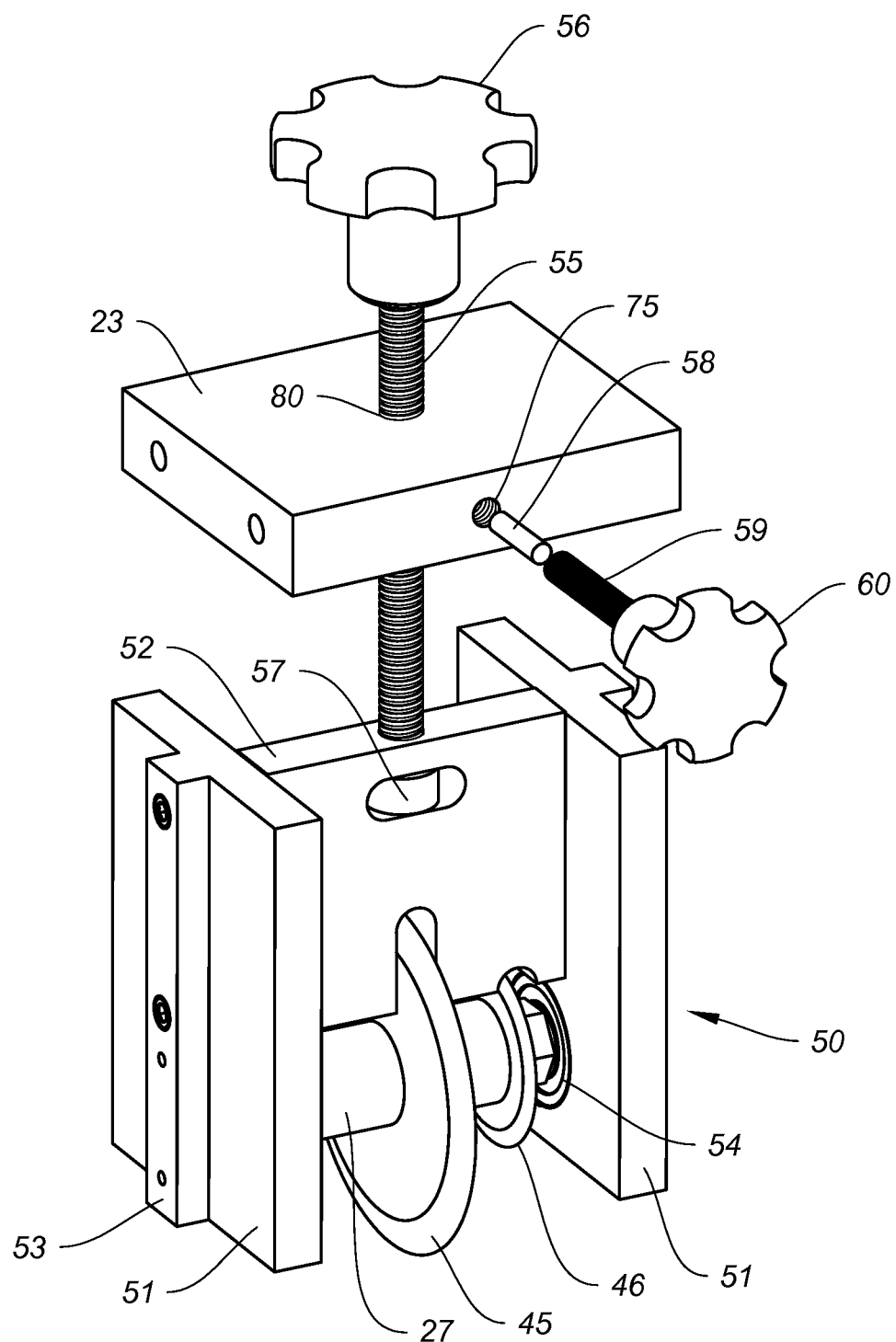
FIG. 3 is a rear, perspective view of circular cutting tool carriage assembly and vertical height adjustment assembly of the present invention.

As shown in FIG. 3, the wire stripping apparatus cutting tool carriage assembly 50 preferably includes a pair of vertically spaced first and second carriage side members 51 connected to spanning member 52. Each carriage side member 51 has a spline guide member 53 that is received in slots 62 of the vertical planar members 21 and 22 of the main support structure 20.

Preferably, the side members 51 are vertically disposed planar members. Side members 51 receive second shaft bearings 54 that support second shaft 27, allowing it to freely rotate as it carries the first and second circular cutting tools 45 and 46. Preferably, the carriage side members 51 are attached perpendicularly to the spanning carriage member 52.

As shown in FIGS. 2 and 3, the cutting tool carriage assembly 50 is designed to allow for adjusting the height of the cutting tools 45 and 46 with respect to the feeder wheel 40. The adjustable carriage assembly 50 is connected to the structural framework 20 by a shaft 55 mounted through the supporting frame structure 20. Threaded shaft 55 is disposed within a thread bore 80 of structural frame top plate 23, and has its distal end affixed to cutting tool carriage spanning member 52 by shaft collar 57. Shaft collar 57 allows free rotating motion of shaft in carriage spanning member 52.

Thus by rotating threaded shaft 55 by means of knob 56 within structural top plate 23 the cutting tool carriage assembly 50 is moved either up or down in respect to top plate 23 and more importantly with respect to feeder drive wheel 40. The use of a threaded shaft 55 in this manner allows for infinite adjustability for processing wire and cable 47 having varying insulation 48 thicknesses and varying core 49 diameters.

In the present arrangement the inventor has found that he can process cables having a diameter as little as 0.125 of an inch.

FIG. 3 further illustrates a feature of the present invention that allows for securing the height of cutting tool carriage assembly 50 and the circular cutting tools 45 and 46 after the desired height is selected. A locking bushing 58 is provided on the end of threaded locking shaft 59 which has a locking shaft knob 60 at its end. The threaded locking shaft 59 is mounted in line and perpendicular to said carriage assembly height adjusting shaft 55. Locking shaft 59 is threaded into a bore 75 within the top frame structural plate 23. When locking shaft 59 is rotated clockwise it compresses locking bushing 58 against adjustment shaft 55, preventing adjustment shaft 55 from rotating which secures the height of cutting tool carriage assembly 50 and the first and second cutting tools 45 and 46. With the height of the first and second cutting tools 45 and 46 secured, feeding of a cable 47 with a selected diameter on a continuous basis can take place.

Figure 4:
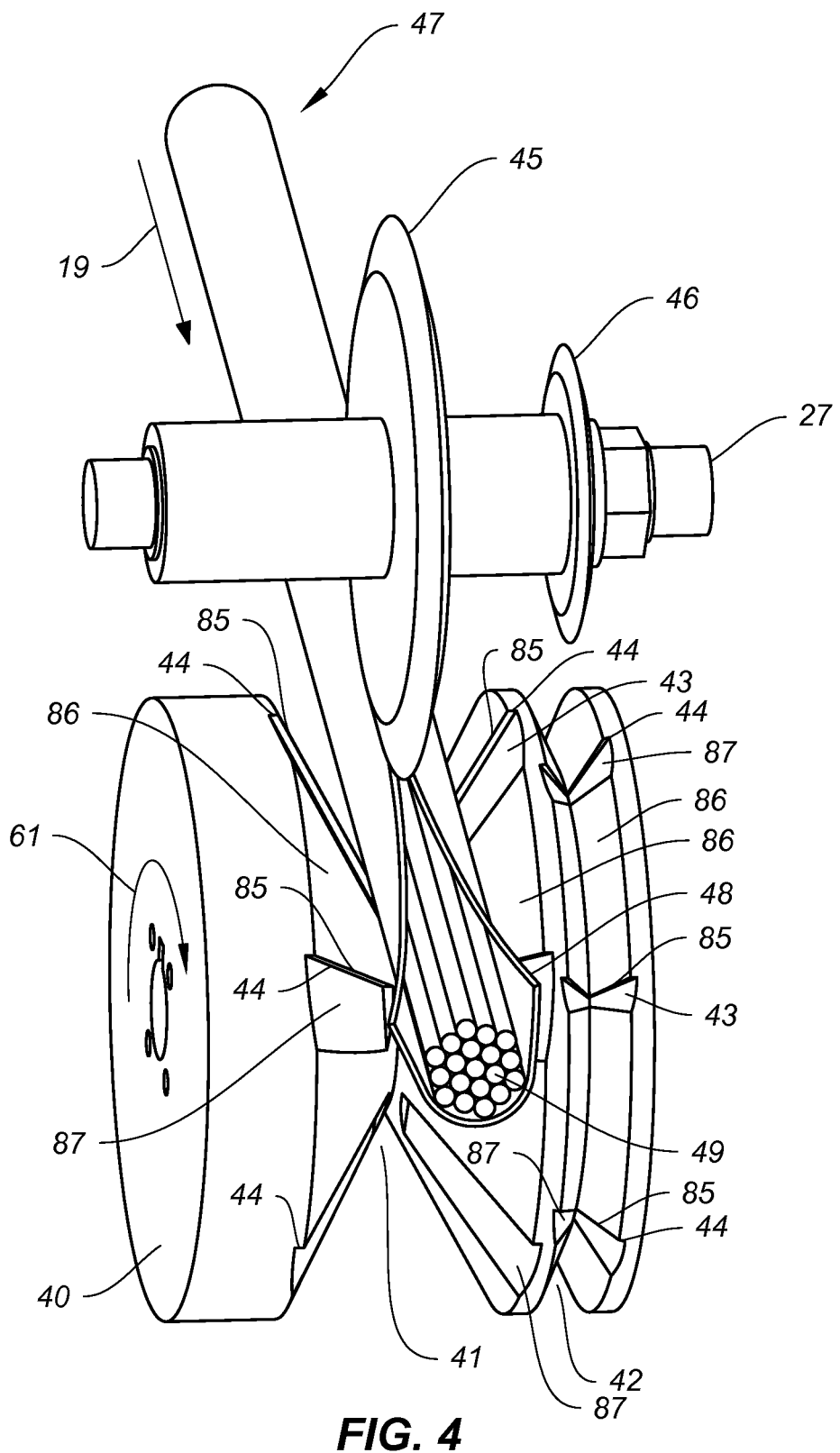
FIG. 4 is a rear, perspective view of a feeder wheel and circular cutting tools that work in cooperation to cut cable insulation from the metal core of a cable, according to the present invention.

As shown in FIG. 4, the feeder wheel 40 first "V"-shaped groove cable guide 41 has a greater depth than the second "V"-shaped groove cable guide 42. Preferably, the first groove cable guide path 41 is designed to receive wire or cables 47 with diameters which are 0.400 of an inch and greater, and the second grove cable guide path 42, which is located along the outer periphery of feeder wheel 40, is designed to receive wire or cables 47 with diameters of 0.125 of an inch to 0.400 of an inch.

Preferably, the first generally "V"-shaped groove cable guide path 41 has an inner circumference dimension that is approximately 40 percent that of the second generally "V"-shaped groove cable path 42, and the second generally "V"-shaped grove cable guide path 42 has an inner circumference dimension that is approximately 240 percent that of the first "V"-shaped groove cable guide path 41. Preferably, the first and second generally "V"-shaped grooves 41 and 42 have first and second interior tapering faces 86 that are generally frusto-conical. These interior tapering faces 86 are relatively steep creating narrow generally "V"-shaped grooves 41 and 42. Preferably, the interior tapering faces 86 of the first generally "V"-shaped groove 41 are set at 61 degrees to the axis of the first shaft 25 and the interior angle created by the interior tapering faces 86 is 58 degrees. Preferably, the interior tapering faces 86 of the second generally "V"-shaped groove 42 are set at 64.5 degrees to the axis of the first shaft 25, and the interior angle created by the interior tapering faces 86 of the second generally "V"-shaped groove 42 is 51 degrees. A large range of such angles is contemplated, and preferably this angle is greater than 45 degrees. In the preferred embodiment, the diameter of the feeder wheel 40 is 4.700 inches and the inner circumferences of the first and second generally "V"-shaped grooves 41 and 42 are set at depths of 1.950 inches and 0.500 inches respectively.

In the preferred embodiment, because the second groove cable guide 42 is located along the outer periphery of feeder wheel 40 it has a greater circumference dimension than that of the first groove guide 41 such that any cable 47 fed through feeder wheel 40 second groove guide 42 will travel at greater velocity than the same cable 47 fed through the first groove guide path 41 which has a smaller circumferential dimension. This allows users to process greater lengths of cable 47 more quickly through feeder wheel 40 second groove cable path 42, without having to use a multiple speed motor 11 or a multiple ratio transmission 28, both of which are more difficult to maintain and add weight to the apparatus 10. A cable 47 of the same diameter fed by way of second "V"-shaped groove path 42 will have a feed rate approximately 140 percent greater as the same cable 47 fed by way of first "V"-shaped groove cable path 41.

FIG. 4 also shows how the first grove guide path 41 of the feeder wheel 40 and the first circular cutting tool 45 cooperate to penetrate and cut the outer insulation 48 of a cable 47 on a continuous basis enabling easy removal of the insulation for the recovery of the metal core 49 of the cable 47.

FIG. 4 also illustrates with arrows 61 the direction of rotation of feeder wheel 40. Preferably, the first and second generally "V"-shaped grooves 41 and 42 are formed with shoulders 44 which are adapted for gripping the insulation 48 of the cable 47. The shoulders 44 create a sharp edge 85 that can cut into the insulation 48. The shoulders 44 and their associate edges 85 substantially span the depths of the first and second cable guide paths 41 and 42. Preferably, the first and second generally "V"-shaped grooves 41 and 42 have first and second interior tapering faces 86 that are generally frusto-conical, and each of these first and second interior tapering faces 86 are provided with a plurality of shoulders 44.

Figure 5:
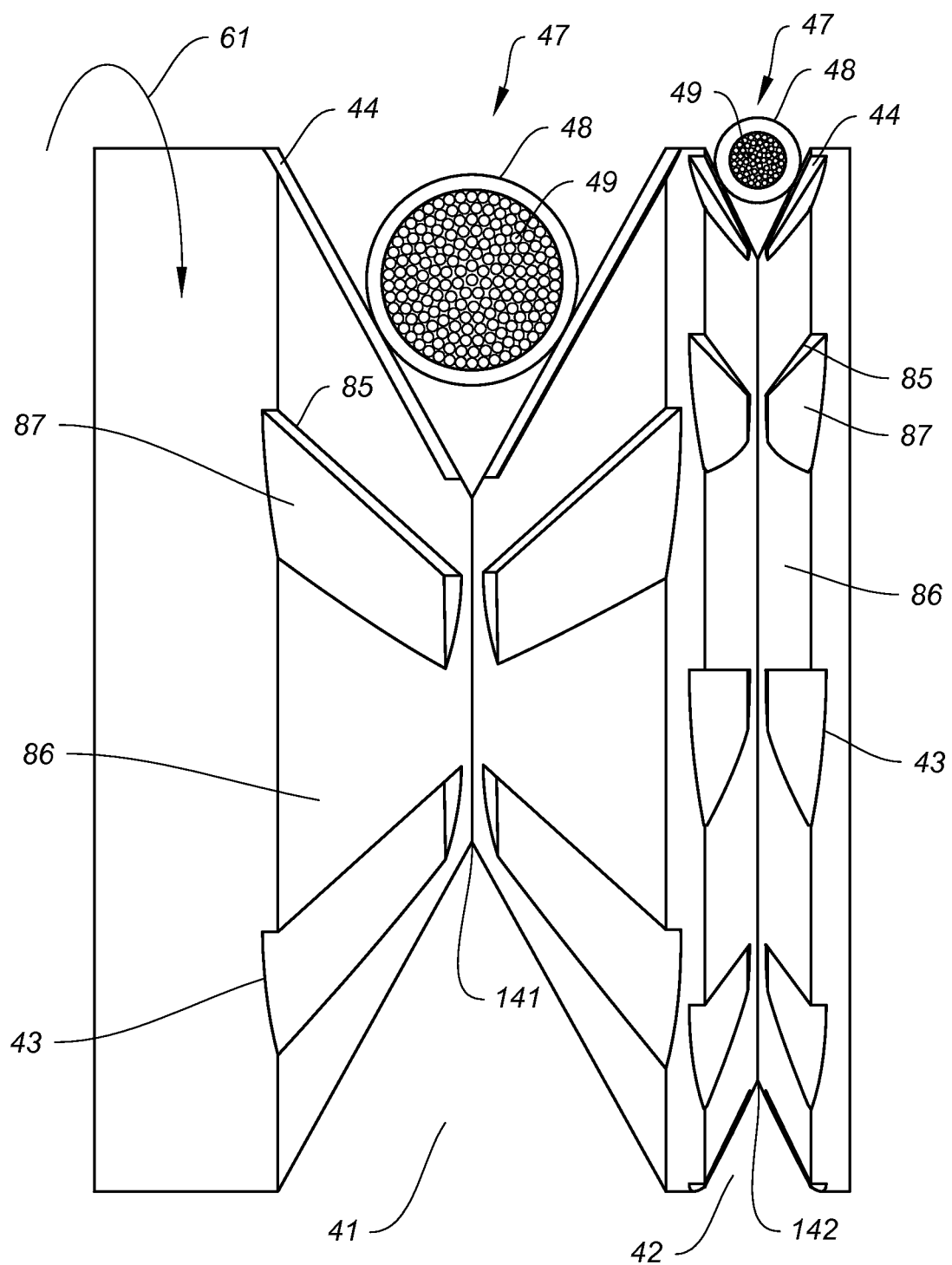
FIG. 5 is a front view of the feeder wheel of the present invention.
Figure 6:
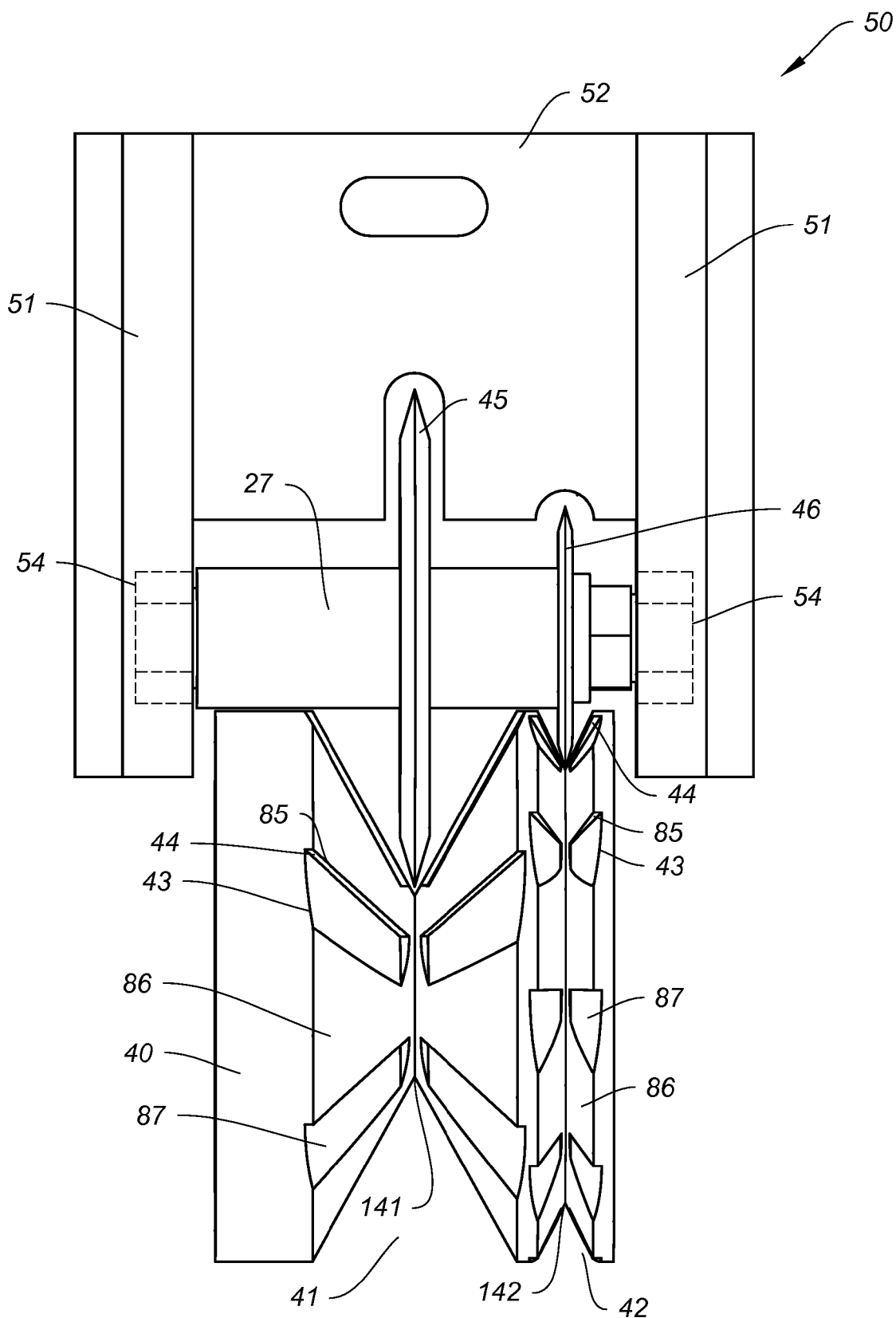
FIG. 6 is a front view of the feeder wheel and circular cutting tools of the present invention.

As shown in FIG. 5, preferably, the first and second grooved cable guides 41 and 42 are also provided with relieved slots 43. These relieved slots 43 taper gradually along the inner faces 86 of grooves 41 and 42 of the feeder wheel 40 until they reach shoulders 44. In particular, a first descending surface 87 tapers from either the first or second interior face 86 deeper into the feeder wheel 40 in a direction opposite of feeder wheel rotation, descending on either the first or second interior tapering faces 86 until it reaches a shoulder 44 that defines the other end of the slot 43 with respect to the rotation of the feeder wheel 40. Preferably, the shoulder 44 provides a deep sharp face which is generally perpendicular to either the first or second interior face 86 of the generally "V"-shaped groove 41 or 42. When the feeder wheel 40 is rotated in direction of arrow 61 the cable gripper shoulder 44 and its edge 85 with the first or second interior face of the groove 86 will partially penetrate and cut into cable insulation 48 pulling the cable 47 through the apparatus. In particular, the first descending surface 87 of the relieved slot 43 creates a gradual, prolonged descent from either the first or second interior tapering surface 86 of the generally "V"-shaped groove 41 or 42 to the shoulder 44, producing an interior angle between the shoulder 44 and the first descending surface 87 that is quite large and such that the shoulder 44 and the first descending surface 87 are generally spaced far apart from each other except where the first descending surface 87 and the shoulder 44 intersect.

The gradual, one-sided tapering design of the relieved slots 43 is such that when salvaged cable 47 having pulling lubricant on its outer surface is stripped of its covering 48, the gripper shoulders 44 are able to continue to grip the cable insulation 48 as lubricant dislodges from cable 47 onto the feeder wheel 40. The slots 43 in front of the shoulders 44 act as drains to keep lubricant from building up in front of and on the shoulders 44 interfering with their ability to cut into the cable 47. In most jobs, this enables the apparatus 10 to be used continuously without stopping for the cleaning of gripping shoulders 44.

Build-up of lubricants can prevent the cable 47 from descending or being received into the grooved cable guide path 41 or 42 at the proper height, preventing the desired engagement of cable insulation 48 with the gripping shoulder 44 of slot 43 needed to pull the cable 47 through the apparatus 10. An additional advantage of the open slot 43 design is that it allows the slot 43 to be easily cleaned of built-up pulling lubricants quickly and effectively without disassembly of the apparatus 10.

A further benefit of the geometry of the "V"-shaped groove cable guides 41 and 42 and the shoulders 44 on the faces 86 of the grooves 41 and 42 is that low friction cables 47 which are typically used without pulling lubricants, and have insulation with a friction coefficient of 0.20 or less, can be gripped and pulled through the cable stripping apparatus 10 by the gripping shoulders 44.

Insulation 48 is stripped from cable 47 in the apparatus according to the following method: the user determines which of the groove cable guide paths 41 or 42 is best suited for the particular cable 47 and determines the proper height for the first or second circular cutting tool 45 or 46 with respect to the first or second generally "V"-shaped groove 41 and 42. The user then sets the cutting tool 45 or 46 at the proper height and locks the height adjustment member 59. The user then activates the drive 11 to rotate the first shaft 25 and the feeder wheel 40. When the feeder wheel 40 is rotating, the user feeds cable 47 having a core 49 surrounded by insulation 48 into the selected generally "V"-shaped groove 41 or 42 in the direction of the rotation of the feeder wheel 40 so that the cable 47 is drawn along the selected circular cutting tool 45 or 46 and its insulation 48 is slit sufficiently to reveal the core 49 of the cable 47.

As shown in FIG. 1, the apparatus 10 is preferably provided with an electric switch assembly 39 having a guarded start button 90 and an extended stop button 91, the switch being connected by a power cord (not shown) having switched plug connector (not shown) to a power source (not shown), the switched plug connector allowing for the connection of the portable motor 11 to the power source, so that the portable drill motor 11 will start and stop by operation of the electric switch assembly 39.

I claim:

1. An apparatus for stripping of insulation lengthwise from an insulated wire or cable having an inner metal core on a continuous basis for the recovery of the metal core, the apparatus comprising:
   a. a supporting frame structure;
   b. a first shaft,
      i. the first shaft being rotatably attached to the frame structure, and
      ii. having a feeder wheel,
      iii. wherein the first shaft is coupled to a drive for rotating the first shaft and the feeder wheel with the first shaft;
   c. the feeder wheel having a first generally "V"-shaped groove cable guide path that is adapted to receive and pull the insulated wire or cable through the apparatus when the drive rotates the feeder wheel,
      i. the first generally "V"-shaped groove cable guide path having an inner circumference at the bottom of the groove,
   d. a cutting assembly,
      i. having a second shaft rotatably attached to the frame structure in a manner that allows the position of the second shaft with respect to the first shaft to be adjusted,
      ii. with a first circular cutting tool mounted on the second shaft which is able to rotate, wherein
      iii. the first cutting tool is aligned with and cooperates with the first generally "V"-shaped groove cable guide path, and
      iv. the first cutting tool of the cutting assembly in conjunction with the feeder wheel is adapted to align and penetrate cable insulation of a cable contained between the first generally "V"-shaped groove cable guide path and the first cutting tool so that insulation may be removed from the metal core; and wherein
   e. the feeder wheel has a second generally "V"-shaped groove cable guide path,
      i. the second generally "V"-shaped groove cable guide path has an inner circumference at the bottom of the groove and the second generally "V"-shaped groove cable guide path is adapted to receive a wire or cable having a diameter range of approximately 0.125 of an inch through approximately 0.400 of an inch, and
      ii. the inner circumferences of the first and second generally "V"-shaped groove cable guide paths are of dissimilar dimension, and
      iii. the first generally "V"-shaped groove cable guide path of the feeder wheel has an inner circumference dimension that is less than the inner circumference dimension of the second generally "V"-shaped groove cable guide path wherein the first generally "V"-shaped groove cable guide path has an inner circumference dimension that is approximately 40 percent that of the second generally "V"-shaped groove cable path, or said second generally "V"-shaped groove cable guide path has an inner circumference dimension that is approximately 240 percent that of the first generally "V"-shaped groove cable guide path; and wherein
   f. the second shaft of the cutting assembly, has mounted thereon a second circular cutting tool which is able to rotate, wherein the second cutting tool is aligned with and cooperates with the second generally "V"-shaped groove cable guide path, wherein at least one of said first and second generally "V" shaped groove cable guide paths is formed with shoulders which are adapted for gripping the insulation of the cable, and
   a. the first and second groove cable guide paths have first and second interior tapering faces that are generally frusto-conical, and
   b. within the first and second interior faces at one or more selected locations there are formed relieved slots, the slots being formed with
      i. a first descending surface that tapers from either the first or second interior face deeper into the feeder wheel in a direction opposite of feeder wheel rotation, descending on either the first or second interior tapering face until it reaches one of said shoulders that defines the other end of the slot with respect to the rotation of the feeder wheel,
      ii. said shoulder providing a deep sharp face which is generally perpendicular to either the first or second interior face of the first or second groove cable guide path, the shoulder being adapted for penetrating the outer cover of cable insulation, gripping the cable and pulling the cable through the apparatus; wherein the first descending surface of the relieved slot creates a gradual, prolonged descent from either the first or second interior tapering surface of the first or second groove cable guide path to the shoulder.

2. The apparatus of claim 1, wherein:
   the first descending surface of the relieved slot creates a gradual, prolonged descent from either the first or second interior tapering surface of the first or second generally "V"-shaped groove cable guide path to the shoulder.

3. The apparatus of claim 1, wherein:
the drive for rotating the feeder wheel, includes a portable electric drill motor connected to said first shaft by a transmission such that when the portable drill motor rotates, the feeder wheel will also rotate.

4. The apparatus of claim 3, wherein:
the portable electric drill has a handle and the portable electric drill is supported on the structure by the handle.

5. The apparatus of claim 1, further comprising:
a cable guide located upstream of said feeder wheel, the cable guide having:
  i. a fixed, lower rotating guide roller on a third shaft, and
  ii. a movable, upper rotating guide roller on a fourth shaft cooperating with the lower guide roller to direct and guide cable flow towards the feeder wheel, the lower guide roller adapted for providing support to a cable against gravity during feeding into the apparatus.

6. The apparatus of claim 5, wherein:
  a. the upper rotating guide roller is adjustable in height in relation to the lower fixed, rotating guide roller to accommodate cable of varying diameters; and
  b. the upper adjustable rotatable guide roller is mounted contiguous to the lower guide roller so that when the height of the upper guide roller is properly adjusted it will corporate with said lower guide roller for aligning and guiding cable into the feeder wheel.

7. The apparatus of claim 6, wherein:
the lower rotatable guide roller has one or more generally "V"-shaped groove cable guide paths that correspond with the one or more generally "V"-shaped groove cable guide paths of the feeder wheel.

8. The apparatus of claim 1, wherein:
the second generally "V"-shaped groove cable path is located on the periphery of the feeder wheel.

9. The apparatus of claim 1, wherein:
the cutting assembly has an adjustable carriage assembly which may be vertically moved with respect to the first shaft, the adjustable carriage assembly having the second shaft mounted thereto, to accommodate varying diameters of cable and wire.

10. The apparatus of claim 9, wherein:
the adjustable carriage assembly comprises:
  i. first and second vertically spaced carriage side members, each having a spline guide member that is received in an openings in the support frame structure,
  ii. each of the side carriage members being attached to a perpendicularly mounted spanning carriage member which receives an adjustable threaded shaft that mounts in a threaded opening in a supporting frame structure top member.

11. The apparatus of claim 10, wherein:
the height of the cutting tool assembly can be locked in position in relative to the feeder wheel.

12. The apparatus of claim 1, wherein:
the first and second circular cutting tools are heat treated tool steel.

13. The apparatus of claim 1, wherein:
the first shaft is rotatably attached to the frame structure in a fixed position.

14. A method of stripping insulation from a cable, comprising:
  a. providing an apparatus including:
    i. a supporting frame structure;
    ii. a first shaft,
      1. the first shaft being rotatably attached to the frame structure, and
      2. having a feeder wheel,
      3. wherein the first shaft is coupled to a drive for rotating the first shaft;
    iii. the feeder wheel having a first generrlly "V"-shaped groove cable guide path,
      1. the first generally "V"-shaped groove cable guide path having an inner circumference at the bottom of the first generally "V"-shaped groove cable guide path, and
    iv. a cutting assembly,
      1. having a second shaft rotatably attached to the frame structure,
      2. with a first circular cutting tool mounted on the second shaft which is able to rotate, wherein
      3. the first cutting tool is aligned with and cooperates with the first generally "V"-shaped groove cable guide path, and
      4. the first cutting tool of the cutting assembly in conjunction with the feeder wheel is adapted to align and penetrate cable insulation of a cable contained between the first generally "V"-shaped groove cable guide path and the first cutting tool so that insulation may be removed from metal core; and wherein
    v. the feeder wheel has a second generally "V"-shaped groove cable guide path,
      1. the second generally "V"-shaped groove cable guide path has an inner circumference at the bottom of the second generally "V"-shaped groove cable guide path, and
      2. the inner circumferences of the first and second generally "V"-shaped grooved cable guide paths are of dissimilar dimension, and
      3. the first generally "V"-shaped groove cable guide path of the feeder wheel has an inner circumference dimension that is less than the inner circumference dimension of the second generally "V"-shaped groove cable guide path wherein the first generally "V"-shaped groove cable guide path has an inner circumference dimension that is approximately 40 percent that of the second generally "V"-shaped groove cable path, or said second generally "V"-shaped groove cable guide path has an inner circumference dimension that is approximately 240 percent that of the first "V"-shaped groove cable guide path; and wherein;
    iv. the second shaft of the cutting assembly, has mounted thereon a second circular cutting tool which is able to rotate, wherein the second cutting tool is aligned with and cooperates with the second generally "V"-shaped groove cable guide path, wherein at least one of said first and second generally "V" shaped groove cable guide paths is formed with shoulders which are adapted for gripping the insulation of the cable, and
  the first and second groove cable guide paths have first and second interior tapering faces that are generally frusto-conical, and
  within the first and second interior faces at one or more selected locations there are formed relieved slots, the slots being formed with
  i. a first descending surface that tapers from either the first or second interior face deeper into the feeder wheel in a direction opposite of feeder wheel rotation, descending on either the first or second interior tapering face until it reaches one of said shoulders that defines the other end of the slot with respect to the rotation of the feeder wheel, ii. said shoulder providing a deep sharp face which is generally perpendicular to either the first or second interior face of the first or second groove cable guide path, the shoulder being adapted for penetrating the outer cover of cable insulation, gripping the cable and pulling the cable through the apparatus; wherein the first descending surface of the relieved slot creates a gradual, prolonged descent from either the first or second interior tapering surface of the first or second groove cable guide path to the shoulder;

b. determining the proper height for the first circular cutting tool with respect to the first generally "V"-shaped groove cable guide path and setting the first circular cutting tool at the proper height;

c. activating the drive to rotate the first shaft and the feeder wheel;

d. feeding cable having a core surrounded by insulation into the first generally "V"-shaped groove cable guide path in the direction of the rotation of the feeder wheel so that the cable is drawn along the first circular cutting tool and its insulation is slit sufficiently to reveal the core of the cable.

15. An apparatus for stripping of insulation lengthwise from an insulated wire or cable having an inner metal core on a continuous basis for the recovery of the metal core, the apparatus comprising:

a. a supporting frame structure;

b. a first shaft,
   i. the first shaft being rotatably attached to the frame structure, and
   ii. having a feeder wheel,
   iii. wherein the first shaft is coupled to a drive for rotating the first shaft;

c. the feeder wheel having a first groove cable guide path and a second groove cable guide path that are adapted to receive and pull the insulated wire or cable through the apparatus when the drive rotates the feeder wheel,
   i. the first grove cable guide path having an inner circumference at the bottom of the first groove cable guide path, and
   ii. the second groove cable guide path having an inner circumference at the bottom of the second groove cable guide path, and the inner circumferences of the first and second groove cable guide paths are of dissimilar dimension and the first groove cable guide path of the feeder wheel has an inner circumference dimension that is less than the inner circumference dimension of the second groove cable guide path, and
   iii. the first groove cable guide path of the feeder wheel has an inner circumference dimension that is less than the inner circumference dimension of the second groove cable guide path wherein the first groove cable guide path has an inner circumference dimension that is approximately 40 percent that of the second groove cable guide path, or said second groove cable guide path has an inner circumference dimension that is approximately 240 percent that of the first groove cable guide path, wherein at least one of said first and second generally "V" shaped groove cable guide paths is formed with shoulders which are adapted for gripping the insulation of the cable, and the first and second groove cable guide paths have first and second interior tapering faces that are generally frusto-conical, and within the first and second interior faces at one or more selected locations there are formed relieved slots, the slots being formed with i. a first descending surface that tapers from either the first or second interior face deeper into the feeder wheel in a direction opposite of feeder wheel rotation, descending on either the first or second interior tapering face until it reaches one of said shoulders that defines the other end of the slot with respect to the rotation of the feeder wheel, ii. said shoulder providing a deep sharp face which is generally perpendicular to either the first or second interior face of the first or second groove cable guide path, the shoulder being adapted for penetrating the outer cover of cable insulation, gripping the cable and pulling the cable through the apparatus; wherein the first descending surface of the relieved slot creates a gradual, prolonged descent from either the first or second interior tapering surface of the first or second groove cable guide path to the shoulder;

d. a cutting assembly,
   i. having a second shaft rotatably attached to the frame structure,
   ii. with first and second circular cutting tools mounted on the second shaft which are able to rotate, wherein
   iii. the first cutting tool is aligned with and cooperates with the first groove cable guide path and the second cutting tool is aligned with and cooperates with the second groove cable guide path, and
   iv. the first and second cutting tools of the cutting assembly in conjunction with the feeder wheel are adapted to align with and penetrate cable insulation of a cable contained between one of the first groove cable guide path and the first cutting tool and the second groove cable guide path and the second cutting tool so that insulation may be removed from metal core.

16. The apparatus of claim 15, wherein:
the second groove cable guide path is located on the periphery of the feeder wheel.

17. The apparatus of claim 15, wherein:
the first shaft is rotatably attached to the frame structure in a fixed position.

* * * * *